United States Patent [19]

Barnes et al.

[11] Patent Number: 4,670,013
[45] Date of Patent: Jun. 2, 1987

[54] CONTAINER FOR BLOOD AND BLOOD COMPONENTS

[75] Inventors: Bruce E. Barnes, Kensington; Mohan S. Mahal, Pleasant Hill, both of Calif.

[73] Assignee: Miles Laboratories, Inc., Elkhart, Ind.

[21] Appl. No.: 786,455

[22] Filed: Oct. 11, 1985

Related U.S. Application Data

[62] Division of Ser. No. 453,385, Dec. 27, 1982, abandoned.

[51] Int. Cl.$^4$ ............................................. A61B 19/00
[52] U.S. Cl. ................................................... 604/403
[58] Field of Search ........................ 604/8–10, 604/262, 403, 410; 128/DIG. 24; 435/2

[56] References Cited

U.S. PATENT DOCUMENTS 4,507,387 3/1985 Gajewski et al. ...................... 435/2

FOREIGN PATENT DOCUMENTS 051415 12/1982 European Pat. Off. .

Primary Examiner—John D. Yasko
Attorney, Agent, or Firm—James A. Giblin; Pamela A. Simonton

[57] ABSTRACT

A blood container for storage of blood and blood components is disclosed. The invention comprises a blood container and a multiple blood bag system which includes a donor bag and one or more satellite bags connected by flexible tubing. The blood bag is made of polyvinyl chloride (PVC) plasticized with a blend of plasticizers comprising a plasticizer resistant to blood extraction such as a triester of trimellitic acid and a 7–10 carbon alcohol and a blood extractable plasticizer such as a dioctyl phthalate or dioctyl adipate and is suitable for long term storage of whole blood, red cells and platelets. The blood container is made of a thin material which contains a plasticizer composition extractable at much lower levels by blood or plasma than conventional phalate plasticized PVC. Blood and blood components processed or stored in the blood bags will exhibit relatively low levels of contamination by plasticizer.

13 Claims, 1 Drawing Figure

CONTAINER FOR BLOOD AND BLOOD COMPONENTS

This application is a division of application Ser. No. 453,385, filed Dec. 27, 1982, now abandoned.

BACKGROUND OF THE INVENTION

1. Field of the Invention

This invention relates to blood containers and to multiple blood bag systems for collecting processing and storage of blood and blood components under sterile conditions. Further objects of the invention will be evident from the following description wherein parts and percentages are by weight unless otherwise specified.

2. Description of the Prior Art

For a number of years, blood has been collected and processed into various components such as packed red cells, plasma platelets and cryoprecipitate, using a system comprising two or more plastic bags interconnected by tubing. The blood is first collected from a donor into a primary or donor bag to which is connected one or more secondary or satellite bags. Both the donor and satellite bags have been routinely made of polyvinyl chloride (PVC) film containing as plasticizer di-2-ethylhexyl phthalate (DEHP).

For some time, however, it has been known that considerable amounts of DEHP are leached from the walls of the blood bags by the plasma in the blood when blood or packed red cells are stored for long periods of time. There has been concern over the potentially harmful effects of DEHP on patients repeatedly infused with blood or blood components even though there appears to be no significant toxicity based on animal studies.

Consequently, we have tested numerous plastic formulations in an attempt to find acceptable material for blood bags which would be flexible, translucent, steam sterilizable and contain a low level of leachable plasticizers. The material should also have properties which are not detrimental to the components of blood; for example, the material should not cause undue hemolysis of red cells or decrease the viability of platelets upon storage to levels which would be clinically unacceptable.

It was shown very early that the commercially available blood bags, which were made of PVC plasticized with DEHP, were generally better than glass containers for the long term storage of blood. Strumia et al (J. Lab. and Clin. Med. 46, 225, 1955) demonstrated that hemolysis was less and post transfusion survival of the red cells was improved for blood stored in these plastic bags. This inherent property of PVC bags plasticized with DEHP has contributed to this being until recently the only material for blood bags which was and still is acceptable and approved by Government regulatory agencies for storage of red blood cells. It has been theorized that this condition of decreased hemolysis of red cells is attributable to the DEHP (or dioctyl adipate) which is extracted from the bag by the blood and that the DEHP inhibits hemolysis (U.S. Pat. No. 4,222,379, hereinafter '379).

Platelet concentrates are routinely obtained by well established procedures from blood plasma and are stored in medical grade polyvinyl chloride (PVC) bags at about 22° C. prior to use.

Platelet concentrates contain glucose (dextrose) as a consequence of the process by which they are collected since the blood has been collected in bags containing buffered anticoagulants such as ACD (acid citrate-dextrose) or CPD (citrate-phosphate-dextrose). During storage, the platelets convert glucose to lactic acid and carbon dioxide ($CO_2$) which lower the pH. Murphy and Gardner (Blood, Vol. 46, No. 2, pp. 209-218, 1975) measured $CO_2$ and oxygen pressures in various PVC and polyethylene (PE) bags containing platelet concentrates and observed that the drop in pH was greater the thicker the walls of the bag. Since oxygen is known to suppress conversion of glucose to lactic acid, it was concluded that the efficiency of oxygen transport into and $CO_2$ transport from the bags was dependent upon the thickness of the bag walls. For a given platelet count, the pH drop of stored concentrates was significantly less for thin walled containers. Concentrates with high platelet counts ($2 \times 10^6/mm^3$ and greater) stored in standard PVC bags whose walls were considerably thicker had a pH of around 6.0 or lower after three days storage. Murphy and Gardner (Blood, Vol. 35, pp. 549-557, 1970) have also shown that an abrupt loss of in vivo viability occurs if pH falls below 6.0 during storage.

Unfortunately, thicker-walled bags are necessary in the process of obtaining platelet concentrates since the bags are subjected to high speed centrifugation and must be resistant to rupturing. To achieve the degree of flexibility needed for standard PVC bags, the PVC contains a certain percentage of DEHP plasticizer. In the past there has been concern over the possibility of harmful effects on platelets of DEHP which leaches into platelet concentrates stored in standard PVC containers. Although PE contains no plasticizers, it would not be a suitable material for bags in which to collect platelet concentrates any more than thin-walled PVC bags since they are highly susceptible to rupturing during pressure steam sterilization and/or centrifugation.

It would therefore be highly desirable to be able to store platelets in a plastic container having sufficient tensile strength to withstand pressure sterilization and highspeed centrifugation while at the same time having good carbon dioxide and oxygen permeability characteristics so as to prolong platelet survival. It is a particular advantage to prolong platelet survival beyond a three day survival period.

In U.S. Pat. No. 4,280,497 ('497) a plastic container was found which withstands rupturing during pressure heat sterilization and high-speed centrifugation and which had superior characteristics for transmitting carbon dioxide and oxygen. Platelets when stored in such a container maintain acceptable viability for at least five days or longer.

The container of '497 was made in the shape of a bag whose walls were composed of PVC film plasticized with about 30 to about 50 weight percent of tri 2-ethylhexyl trimellitate, preferably about 37 weight percent, and about 3 to 5, preferably about 3.5 weight percent of a heat stabilization system suitable for medical grade PVC plastics such as epoxidized vegetable oils. Typical of the latter were epoxidized soy bean oil and epoxidized linseed oil. Although not critical, the heat stabilization system preferably also included small amounts, i.e., less than one percent, preferably about 0.60 percent, of a metal soap such as zinc stearate, calcium stearate or the like. Very small amounts of a lubricant such as mineral oil could also be included, i.e., less than 0.5 percent.

The blood bag system taught in '379 is a donor bag and transfer bag made of plastic materials which each comprises a different polymer entity. The donor bag is PVC plasticized with DEHP; the transfer bag to be used for platelet storage is made from a material which exhibits relatively high capability to permit the diffusion of carbon dioxide such as the polyolefin-thermoplastic rubber formulation of U.S. Pat. No. 4,140,162. Other transfer bags in the above system may be made of a polyester in accordance with the teachings of U.S. Pat. No. 4,045,431.

It is, however, desirable in the manufacture of blood bag systems to make all of the components, such as the bags, tubing, etc., out of the same material. In this way compatibility of material of each component is assured and manufacturing problems are lessened.

In U.S. patent application Ser. No. 216,098 filed Dec. 15, 1980, there is disclosed an improved multiple blood bag system in which donor as well as transfer bags are made of polymeric substances which are substantially free of blood-extractable plasticizers such as PVC plasticized with tri-2-ethylhexyl trimellitate, polyester, or polycarbonate. The polymeric substance for a donor bag could be the same or different from that of a transfer bag. The polymeric substances were selected so that when whole blood or packed red cells were stored in a donor bag of such material for up to 21 days, the degree of hemolysis was such that the amount of surviving red cells was sufficient for clinical requirements. The polymeric substances also were favorable in the functions for which transfer bags are used such as platelet storage, cryoprecipitate collection and the like.

A polyurethane film is described in United Kingdom Patent Specification No. 1,587,522. The polyurethane film may be used to fabricate blood bags for the removal, storage, deep-freezing, and transfusion of blood and blood constituents.

SUMMARY OF THE INVENTION

We have discovered an improved plastic film which may be used in the manufacture of containers for blood and blood components and in the manufacture of a multiple blood bag system.

The material of the invention is PVC plasticized with a blend of plasticizers, comprising a plasticizer resistant to extraction by blood such as a a triester of trimellitic acid and a 7-10 carbon alcohol (TET), and a blood extractable plasticizer such as dioctyl phthalate (DOP) or dioctyl adipate (DOA); the present material allows storage of red blood cells for a period of at least 21 days and platelets for a period of at least 5 days. The nature and amount of blood extractable plasticizer present in the PVC should be sufficient to allow at least 21-day storage of red blood cells stored therein and the total amount of plasticizer blend should be sufficient to enhance the gas permeability of the plastic formulation to allow at least 5-day storage of platelets stored therein.

One important advantage of the invention is that all components of a blood bag system, i.e., bags, tubing, etc., may be fabricated from the plastic formulation of the invention. Thus, manufacturing problems that are presented in attempting to carry out the teaching of '379 are avoided when utilizing the present plastic film. There is no problem with compatibility of plastic film and blood bag system components, which might confront the manufacturer in preparing a blood bag system from different polymer entities.

Another advantage of the invention is that blood stored in the present container for periods of at least 21 days at standard blood storage temperatures will provide clinically effective levels of unhemolyzed red cells and reduced levels of plasticizer such as DOP extracted into the red cells when compared to a container made of a DOP/PVC formulation. In addition, the containers of the invention exhibit a relatively high carbon dioxide and oxygen transmissibility, unexpectedly due to the total amount of plasticizer blend, so that platelets stored therein at standard platelet storage conditions remain clinically viable. We have found surprisingly that the gas transmissibility of the plastic formulation is dependent on the total amount of plasticizer in the PVC, greater transmissibility being achieved with higher plasticizer content. Furthermore, we have discovered unexpectedly that a plasticizer blend is taken up more readily by the PVC resin, and the quantity of plasticizer absorbed is greater, when compared to a single plasticizer that is resistant to blood extraction.

DESCRIPTION OF THE PREFERRED EMBODIMENTS

Figure 1:
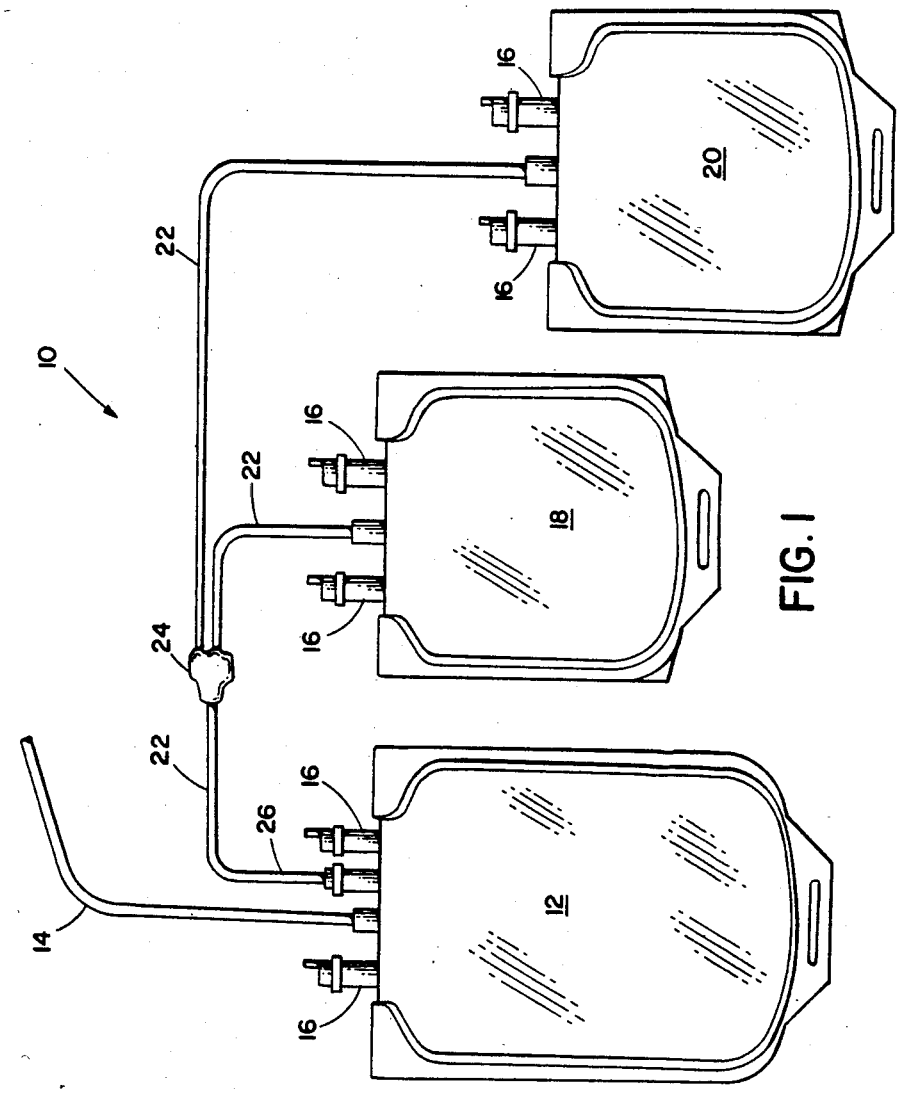
FIG. 1 is a plan view of a multiple blood bag system in accordance with the invention.

Our invention, which may be better understood by reference to the drawing of FIG. 1, comprises a multiple blood bag system 10 having a donor bag 12 joined to one or more satellite bags, in this case two satellite bags 18 and 20, by flexible tubing 22 and a Y-connector 24. The donor and satellite bags or containers may have one or more access ports 16 and donor bag 12 is equipped with a blood collection tube 14 leading to a donor needle (not shown). Fluid flow through tubing 22 from bag 12 is controlled by any conventional valving means 26.

The donor bag 12 as well as satellite bags 18 and 20 and the flexible tubing 22 may be of a polymeric substance comprising polyvinylchloride (PVC) plasticized with a mixture of a substantially non-blood extractable plasticizer and a blood-extractable plasticizer. Alternatively, any flexible polymer, such as polyethylene, could be used in the tubing. The amount of blood extractable plasticizer is sufficient to allow storage of red blood cells in the container for a period of at least 21 days, preferably at least 35 days, with a reduced level of hemolysis when compared to blood stored in a container free from said blood-extractable plasticizer; and the total amount of plasticizer blend is sufficient to enhance the gas permeability of the plastic formulation to allow storage of platelets therein for a period of at least 5 days. The amount of blood extractable plasticizer is at a level resulting in reduced plasticizer extracted into the red cells when compared to PVC plasticized with only the blood extractable plasticizer.

The total amount of plasticizer blend is generally sufficient to enhance the gas permeability of the plastic formulation to maintain the pH of platelets stored therein for at least 5 days above about 6, preferably above 7. Usually, this amount of blend is sufficient to yield a carbon dioxide transmissibility rate of at least about 0.8, preferably about 0.8–1.2, micromoles per hour per $cm^2$, more preferably at least about 0.9 micromoles/hour/$cm^2$.

The total plasticizer blend in the PVC is about 30–50%, preferably 35–40%, based on the weight of polymeric substance. Generally, the amount of plasticizer resistant to blood extraction is about 20–40%, preferably about 25–30%, and the amount of blood extractable plasticizer is about 5–25%, preferably about 7–15%, based on the weight of polymeric substance.

The plastic container of the invention may be a bag whose walls are composed of PVC film plasticized with the aforementioned blend of plasticizers and preferably which further may contain about 3 to 15, preferably about 3–5 weight percent of a heat stabilization system suitable for medical grade PVC plastics such as epoxidized soy bean oil and epoxidized linseed oil. Although not critical, the heat stabilization system preferably also includes small amounts, i.e., less than one percent, preferably about 0.60 percent, of a metal soap such as zinc stearate, calcium stearate or the like. Very small amounts of a lubricant such as mineral oil may be included, i.e., less than 0.5 percent.

The wall thickness of the container may be in the range of 0.010 to 0.020 inch, preferably about 0.012 to 0.016 inch, with 0.015 inch being most preferred, to provide containers having sufficient tensile strength to withstand high pressures generated in their use. Film sheets with which to make bags are obtained by methods well established in the industry. The dimensions of the container may be about 5–6 inches in width and about 5–8 inches in length.

Standard PVC film currently being used for bags in storage of blood or blood components such as platelet concentrates contains about 25 weight percent of the plasticizer di-2-ethylhexyl phthalate (DEHP). It can be shown that about 70 ppm of this plasticizer are present in whole blood after storage therein for 35 days. Under similar conditions only about 10 ppm or less of TET-DOP, primarily DOP, is present in blood stored for 35 days in bags made of PVC containing TET-DOP. Thus, the plasticizer should be considered to be resistant to extraction by blood, i.e., to be substantially non-blood extractable if less than about 10 ppm, preferably less than 5 ppm of such plasticizer is extracted into blood stored for 21 days or more in a container comprising PVC plasticized with such plasticizer.

Exemplary of the blood extractable plasticizers that may be employed in this invention are the dioctyl phthalates, such as di-(2-ethylhexyl)phthalate (DEHP) and diisooctyl phthalate, dioctyl adipates (DOA), dinonyl phthalates such as diisononyl phthalate, didecyl phthalates such as diisodecyl phthalate, and the like. As examples of substantially non-blood extractable plasticizers one may use esters of trimellitic acid and a 7–10 carbon alcohol moiety preferably, for example, tri-isooctyl, tri-n-octyl and tri-2-ethylhexyl (TOTM) or tri-n-heptyl, tri-isoheptyl, tri-2-ethylpentyl, tri-n-nonyl, tri-isononyl, tri-2-ethylheptyl, tri-n-decyl, tri-isodecyl, tri-2-ethylnonyl, or mixtures thereof, or mixed esters thereof, in PVC formulations. The donor and satellite bags are flexible, steam-sterilizable, and transparent, and the plasticizer extracted by blood stored therein for up to 35 days at about 5° C. was substantially reduced when compared to a conventional blood bag made from PVC plasticized with DEHP. This is therefore in sharp contrast to conventional donor bags where large amounts of DEHP plasticizer are extracted into blood stored therein under the same conditions. The amount of hemolysis of red blood cells in blood stored in the bags of the invention is only slightly higher than that for blood stored in the conventional DEHP plasticized PVC bags and is of no clinical significance, the level of hemolysis being clinically acceptable.

As an example of how the multiple blood bag system of our invention is used, blood is collected from a donor into the donor bag of the type specifically described above which may contain an anticoagulant solution such as, for example acid—citrate-dextrose (ACD), USP XX, page 49, citrate-phosphate-dextrose (CPD), USP XX, pages 49–50, CP2D, Lovric et al, *Med. J. Aust.*, 1977, 2, 183–186, CPD plus adenine (CPDA-1), Zuck et al, *Transfusion*, 17, 374–382 (1977). Following centrifugation, the valving means is actuated and the plasma is expressed into one of the satellite bags (of the type described above, i.e., the PVC formulation containing a blend of plasticizers) where it is further centrifuged at an appropriate speed to cause the platelets to separate from the plasma. The platelet poor plasma is expressed into the second satellite bag and the platelets in about 50 ml of plasma are gently agitated in the first satellite bag. After at least 5 days the amount of viable platelets remaining is as good as that for platelets stored for the same period of time in PVC-TOTM plasticized bags of the type described in U.S. Pat. No. 4,280,497.

The multiple blood bag system of the invention may contain additional bags made of the aforementioned polymeric substance. One of those bags may contain a preservative solution for red cell concentrates. These preservative solutions may include, for instance, saline-adenine-glucose (SAG), Hagman et al, *The New England Journal of Medicine*, 299, 1337–1382 (1978) or SAG plus mannitol, U.S. Pat. No. 4,267,269, Ginzburg, *Bibl. Haemat.*, 1971, No. 38, part II, 217–220, and Wood et al, *Blood*, 42, 17–25 (1973). In use, after plasma and platelets have been separated from the red cells as described above, the preservative solution in the satellite or third bag is expressed into the bag containing the red cell concentrate (donor bag 12 in FIG. 1). The red cell concentrate is mixed with the preservative solution and stored under conventional conditions until used.

EXAMPLES

A further demonstration of the invention is illustrated in the examples which follow.

EXAMPLE 1

FIG. 1 illustrates a blood bag system in accordance with this invention. In this particular embodiment the bags are formed from a film sheet folded at the top and heat sealed around three edges to provide the two walls of the bag. In a typical blood bag, the internal surface area is at least about 50 in.² The satellite bags are provided with an inlet which is connected by tubing to the donor primary bag used for collecting whole blood. The satellite bags also have one or more access ports closed by suitable caps.

The film from which the above bags were made contains 10 parts by weight of DOP, 27 parts by weight of tri 2-ethylhexyl trimellitate (TOTM), 5 parts by weight of epoxidized soybean oil, all of which are commercially available. These ingredients were mixed by a blender and formed into sheets by conventional methods such as by calendaring or by extrusion to a thickness of about 0.015 inch.

The multiple blood bag system as described above was first steam sterilized under pressure and was then ready for collection of blood. Blood was collected in the primary bag which contained a buffered anti-coagulant and was first subjected to mild centrifugation to settle the red cells. The upper layer of platelet rich plasma was then expressed into one of the satellite bags. By high speed centrifugation, the platelets were collected at the bottom of the satellite bag and the platelet poor plasma was then expressed into another container. Approximately 50 ml of the plasma remained in the satellite bag and the platelets are suspended in this volume of plasma. Prior to use of the platelet concentrate, the bags were gently tumbled or agitated at about room temperature to maintain the platelets in suspension and to aid in the transport of oxygen into the concentrate and the passage of carbon dioxide from the interior of the bag.

Platelet viability was determined at intervals of 5 and 7 days of storage at 22° C. in the PVC bags containing TOTM-DEHP and in PVC-DEHP bags and those of U.S. Pat. No. 4,280,497 of the same wall thickness. The PVC-DEHP contained 37% of di 2-ethylhexyl phthalate and the '479 bag (PVC-TOTM) contained 10% of tri-(2-ethylhexyl)trimellitate.

TABLE 1

| In Vitro Studies of Platelets Stored at 22° C. | | |
|---|---|---|
| In Bags | 5-days | 7-days |
| | pH | |
| PVC—TEHTM—DEHP | 7.06 | 6.78 |
| PVC—TEHTM | 7.06 | 6.72 |
| | Platelet Count, N/Ml. | |
| PVC—TEHTM—DEHP | 1.43 × 10$^9$ | 1.35 × 10$^9$ |
| PVC—TEHTM | 1.43 × 10$^9$ | 1.35 × 10$^9$ |

The pH of suspensions of platelets in the PVC-TOTM bags remained remarkably constant, averaging 7.06 and 6.78, respectively, for these intervals of storage compared to 7.06 and 6.72, respectively, for PVC-TOTM.

Carbon dioxide transmission rates through the walls of the two types of bags were determined. For the PVC-TOTM-DEHP film, the rate was 0.90M-mol/Hr/cm$^2$, as compared to 0.88M-mol/Hr/cm$^2$ for the PVC-TOTM film.

These results clearly demonstrate that platelets in the form of concentrates will remain viable for in vivo use even after five days storage at 22° C. when stored in high tensile strength PVC bags which contain DEHP-TOTM as plasticizer. Furthermore, morphology of the platelets remained good (discoid shape) even after 7 days storage when examined by light microscope. Platelets stored in standard PVC bags containing DOP alone, on the other hand, show considerably reduced viability and their morphology is distinctly inferior.

EXAMPLE 2

Platelet survival studies in vivo were carried out using a blood bag system described in Example 1. The procedure followed for these studies and the method of analysis were that described by Archer et al (1982) Vox Sang. 43:223–230 (incorporated herein by reference). Platelet concentrates were prepared in the blood bag system as described in Example 1 and stored with gentle shaking at room temperature for periods of 5 days before labelling with isotope and reinfusing.

The post-transfusion recovery of platelets in circulation (6 patients) was 52.7±10.2%. The half-life ($t_{\frac{1}{2}}$) was 3.0±0.5 days and the pH of the platelets after 5 days was 7.10±0.1.

EXAMPLE 3

Plastic formulations were produced by adding the plasticizer to PVC resin at approximately 90° C. in a ribbon blender. Plasticizer blends were formulated prior to addition to the PVC resin. After addition of plasticizer, epoxidized soybean oil (ESO), and mineral oil as a stabilizer were added. The mixture was blended for 30 minutes, removed from the blender, and visually inspected.

The plastic formulations studied were as follows:

| Plastic formulation | Parts | | | | | | Control 1* | Control 2 | Control 3** |
|---|---|---|---|---|---|---|---|---|---|
| | A | B | C | D | E | F | | | |
| PVC resin | 100 | 100 | 100 | 100 | 100 | 100 | 100 | 100 | 100 |
| TOTM | 63 | 63 | 40 | 50 | 40 | 30 | 63 | 80 | 0 |
| DEHP | 10 | 20 | 40 | 40 | 50 | 50 | 0 | 0 | 46 |
| ESO | 5 | 5 | 5 | 5 | 5 | 5 | 5 | 5 | 12 |
| Stabilizer | 1 | 1 | 1 | 1 | 1 | 1 | 1 | 1 | — |
| Mineral oil | 0.5 | 0.5 | 0.5 | 0.5 | 0.5 | 0.5 | 0.5 | 0.5 | — |

*Formulation of U.S. Pat. No. 4,280,497
**Conventional DEHP-PVC blood bag.

After 30 minutes of blending, all samples except Control 2 exhibited similar dryness. Control 2, however, appeared noticeably wetter than the other formulations indicating that the PVC resin absorbed less of the plasticizer in Control 2 when compared to the other formulations.

This comparison of samples B, C, and F with Control 2 shows that plasticizer blend is absorbed by the PVC resin more readily than equivalent amounts of a single TOTM plasticizer.

What is claimed is:

1. A container for storage of blood or blood components which comprises a flexible, translucent, heat-sterilizable, heat-sealable polymeric substance comprising polyvinyl-chloride plasticized with a mixture comprising a blood extractable plasticizer being present in an amount of 5 to 25 percent by weight, and a plasticizer resistant to blood extraction being present in an amount of 20 to 40 percent by weight, the total amount of plasticizer mixture being sufficient to enhance the gas permeability of the polymeric substance to provide clinically effective levels of platelets stored therein for a period of at least five days and the blood extractable plasticizer being present in an amount sufficient to provide clinically effective levels of unhemolyzed red cells stored therein for a period of at least 35 days without being significantly extracted and without raising the level of extracted plasticizer mixture above about 10 ppm in blood or red cell concentrates stored therein for 35 days, whereby the blood or red cell concentrates are substantially free of said plasticizer mixture.

2. The container of claim 1 wherein the plasticizer resistant to blood extraction is a triester of trimellitic acid and a 7–10 carbon alcohol.

3. The container of claim 1 wherein the plasticizer resistant to blood extraction is tri-(2-ethylhexyl) trimellitate.

4. The container of claim 1 wherein the blood extractable plasticizer is a dioctyl phthalate or a dioctyl adipate.

5. The container of claim 1 wherein the blood extractable plasticizer is di-(2-ethylhexyl)phthalate.

6. The container of claim 1 wherein the plasticizer mixture is present in an amount sufficient to enhance the gas permeability of the polymeric substance to maintain the pH of platelets stored therein for at least 7 days above about 6.

7. The container of claim 1 wherein the plasticizer mixture is present in an amount sufficient to yield a carbon dioxide transmissibility rate of at least about 0.8 micromoles/hour/cm$^2$.

8. The container of claim 1 wherein the total amount of plasticizer mixture is about 30–50% and the amount of plasticizer resistant to blood extraction is about 20–35%, based on the weight of polymeric subtance.

9. The container of claim 1 wherein the total amount of plasticizer mixture is about 35–50% and the amount of blood extractable plasticizer is about 5–25%, based on the weight of polymeric substance.

10. The container of claim 1 which contains an anticoagulant.

11. The container of claim 10 wherein the anticoagulant comprises citrate, phosphate, and dextrose.

12. The container of claim 10 which further contains a red blood cell concentrate.

13. The container of claim 1 which contains a platelet concentrate.

* * * * *